(12) United States Patent
Mikijelj

(10) Patent No.: US 9,302,944 B2
(45) Date of Patent: Apr. 5, 2016

(54) SI₃N₄ INSULATOR MATERIAL FOR CORONA DISCHARGE IGNITER SYSTEMS

(71) Applicant: CERADYNE, INC., Costa Mesa, CA (US)

(72) Inventor: Biljana Mikijelj, Cerritos, CA (US)

(73) Assignee: CERADYNE, INC., Costa Mesa, CA (US)

( * ) Notice: Subject to any disclaimer, the term of this patent is extended or adjusted under 35 U.S.C. 154(b) by 75 days.

(21) Appl. No.: 14/215,512

(22) Filed: Mar. 17, 2014

(65) Prior Publication Data

US 2014/0200131 A1 Jul. 17, 2014

Related U.S. Application Data

(63) Continuation of application No. 13/374,216, filed on Dec. 16, 2011, now Pat. No. 8,673,795.

(51) Int. Cl.
C04B 35/00 (2006.01)
C04B 35/584 (2006.01)
(Continued)

(52) U.S. Cl.
CPC ............ *C04B 35/584* (2013.01); *C04B 35/587* (2013.01); *C04B 35/591* (2013.01); *C04B 35/593* (2013.01); *C04B 35/597* (2013.01); *C04B 35/5935* (2013.01); *C04B 35/645* (2013.01); *C04B 35/6455* (2013.01); *C04B 35/65* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/3409* (2013.01); *C04B 2235/3418* (2013.01); *C04B 2235/36* (2013.01); *C04B 2235/386* (2013.01); *C04B 2235/3839* (2013.01); *C04B 2235/428* (2013.01); *C04B 2235/5409* (2013.01); *C04B 2235/5427* (2013.01); *C04B 2235/6021* (2013.01); *C04B 2235/6022* (2013.01); *C04B 2235/6023* (2013.01); *C04B 2235/612* (2013.01); *C04B 2235/6587* (2013.01); *C04B 2235/668* (2013.01); *C04B 2235/721* (2013.01); *C04B 2235/723* (2013.01); *C04B 2235/725* (2013.01); *C04B 2235/767* (2013.01);
(Continued)

(58) Field of Classification Search
CPC .... C04B 35/584; C04B 35/587; C04B 35/597
USPC .......... 501/97.1, 97.2, 97.3, 97.4, 98.1, 98.2, 501/98.3
See application file for complete search history.

(56) References Cited

U.S. PATENT DOCUMENTS 4,879,260 A 11/1989 Manning
5,256,610 A 10/1993 Bansal et al.
(Continued)

FOREIGN PATENT DOCUMENTS

JP 05-155662 A 6/1993
JP 2001-163674 A 6/2001

*Primary Examiner* — Noah Wiese
(74) *Attorney, Agent, or Firm* — C. Michael Geise

(57) ABSTRACT

A silicon nitride material is disclosed which has properties beneficial for efficient operation of a corona discharge igniter system in an internal combustion gas engine.

2 Claims, 1 Drawing Sheet

5 µm

(51) Int. Cl.

*C04B 35/587* (2006.01)
*C04B 35/591* (2006.01)
*C04B 35/593* (2006.01)
*C04B 35/597* (2006.01)
*C04B 35/645* (2006.01)
*C04B 35/65* (2006.01)

(52) U.S. Cl.
CPC ........ *C04B 2235/77* (2013.01); *C04B 2235/85* (2013.01); *C04B 2235/9607* (2013.01)

(56) References Cited

U.S. PATENT DOCUMENTS

| | | |
|---|---|---|
| 5,326,733 A | 7/1994 | Mizuno et al. |
| 5,358,912 A | 10/1994 | Freitag |
| 6,184,164 B1 * | 2/2001 | White et al. ............ 501/32 |
| 6,291,376 B1 | 9/2001 | White et al. |
| 6,451,416 B1 * | 9/2002 | Holowczak et al. ....... 428/293.4 |
| 6,784,131 B2 | 8/2004 | Komatsu et al. |
| 6,797,660 B2 | 9/2004 | Komatsu |
| 6,883,507 B2 | 4/2005 | Freen |
| 7,169,723 B2 | 1/2007 | Walker, Jr. |
| 8,053,966 B2 | 11/2011 | Walker, Jr. |
| 8,071,495 B2 | 12/2011 | Pujari et al. |
| 2006/0014624 A1 | 1/2006 | Mikijelj |
| 2010/0175655 A1 | 7/2010 | Lykowski et al. |
| 2010/0282197 A1 | 11/2010 | Permuy et al. |
| 2011/0175691 A1 | 7/2011 | Smith et al. |
| 2011/0247579 A1 | 10/2011 | Hampton et al. |

* cited by examiner

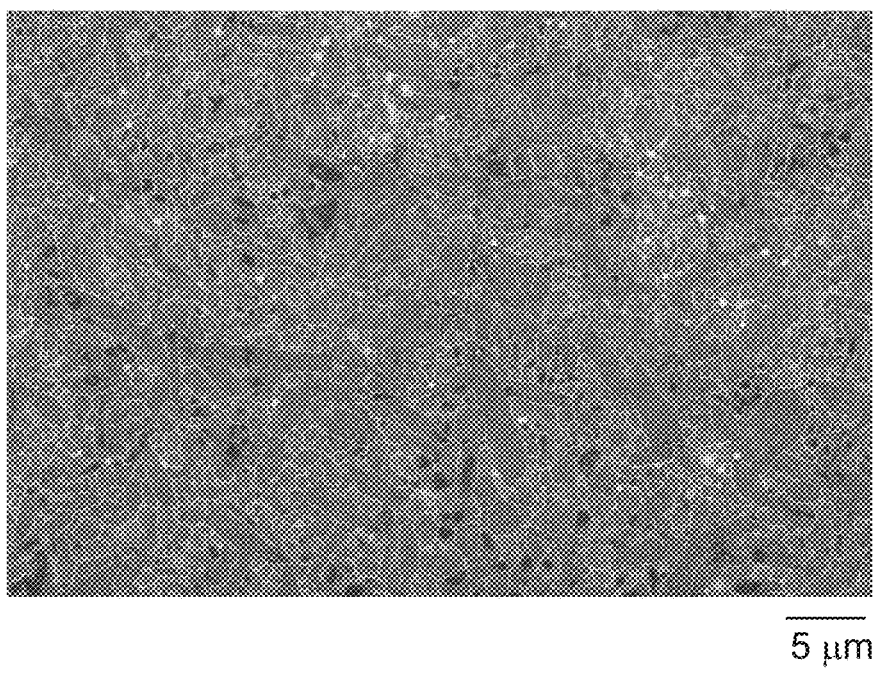
5 μm

$SI_3N_4$ INSULATOR MATERIAL FOR CORONA DISCHARGE IGNITER SYSTEMS

FIELD

The present invention pertains generally to the field of technical ceramic materials and more specifically to a high performance monolithic silicon nitride material used as a ceramic insulator in corona discharge igniter systems for internal combustion engines and gas turbines.

BACKGROUND

Due to the recently rising prices of oil, as well as legislation for emission control, increases in fuel efficiency in internal combustion engines have become extremely important. Governments in many countries have mandated automobile manufacturers to reach increased gas mileage for vehicle models manufactured in the near future.

One way to increase the fuel efficiency is to change the current state of the art of spark plugs which ignite the fuel in the internal combustion engine by generating a spark (plasma) between narrow gap electrodes separated by an air-fuel mixture, by more energy efficient corona discharge igniter (CDI) systems. In a CDI system, instead of a short duration spark, a steady corona discharge is generated between electrodes and around the ceramic insulator tip using a radio frequency electromagnetic field. The generation of a corona discharge does not require a dielectric breakdown of the air-gas mixture to occur to ignite the fuel. The corona is therefore generated at lower voltages than required for a spark. The corona generates a steady fuel burning front that is easier to control and increases the fuel efficiency. It also allows ignition of lean fuel mixtures that burn cleaner but are difficult to ignite using spark-plugs.

One CDI system is described in U.S. Pat. No. 6,883,507 (Freen), and it specifies that a feed-thru insulator is used for the system to work. The patent advises the use of BN (boron nitride) for this purpose (line 35-36, column 6), and does not provide additional guidance for the nature of insulator material.

U.S. Publication No. 2011/0175691 A1 (Smith et al) describes a compact electromagnetic device generating a corona discharge in a coaxial resonating cavity that can be used to ignite combustible materials in combustion engines. In their invention, an insulated guide is required which is shown in FIG. 5 (item 510) and FIG. 6 (item 610), however the material used is not specified in any way in the disclosure.

U.S. Publication No. 2011/0247579 A1 (Hampton et al) describes a corona igniter with an enhancing electrode tip composed of metal shapes at the tip of the insulator. The type of insulator is only described as "an insulator that surrounds the electrode body portion and extends from the insulator tip to to insulator upper end" (paragraph [0086]).

U.S. Publication No. 2010/0282197 A1 (Permuy et al) describes in detail the preferred shapes of the feed-thru insulator necessary for this CDI system and specifies that the insulator should be a ceramic material. Same application notes (first three lines of paragraph [0006]) that, although BN is suggested in U.S. Pat. No. 6,883,507 for the insulator due to its high dielectric breakdown strength and a low dielectric constant, that the material is very soft, expensive and difficult to form into required insulator shapes. It is also noted that relative permittivity (i.e. dielectric constant) should be low for the material to have a high dielectric strength (paragraph [0007]), but offers no specific insulator materials that have these properties.

U.S. Publication No. 2010/0175655 A1 (Lykowski et al) describes further that the ceramic insulator (which can be combined with a non-ceramic insulator) is an aluminum or silicon (paragraph [0037] lines 2 and 4) containing oxide and or nitride based ceramic with up to 5% additions of calcium oxide, magnesium oxide, zirconium oxide, boron oxide or boron nitride additions to alumina or silica (paragraph [0039]). Lykowsky et al also disclose that the desired dielectric strength of the ceramic insulator should be above 15 kV/mm (or more preferably 17 kV/mm or above and most preferably above 19 kV/mm) (paragraph [0051]). Additionally, the application describes that the ceramic material should have a modulus of rupture strength (MOR) of at least 100, 200 or 400 MPa (in increasing order of preference), low dielectric constant at 1 MHz (lower than 9-paragraph [0069]), and low loss tangent (most preferably less than 0.005 at 1 MHz-paragraph [0053]). This patent application does not provide any examples of inventive compositions their invention requires. Specific compositions involving silicon nitride, how they can be produced or what they consist of when produced are also not disclosed. The inventors state that alumina, silicon nitride and aluminum nitride of their invention meet the listed properties, but do not provide any data or examples to support any of the properties required by the invention, for any of the composition ranges for any of the materials described.

U.S. Pat. No. 8,053,966 (Walker Jr.) discloses a method of manufacturing $Al_2O_3$ (alumina) ceramic spark plug insulators. In the background portion of the disclosure the inventor states (paragraph [0010]) that typical dielectric strength (RMS) of alumina spark plug materials is about 400 V/mil or 1560 V/mm, substantially lower than what is recommended for CDI in U.S. Publication No. 2010/0175655 A1 above. In the Summary of U.S. Pat. No. 8,053,966, the inventor states (Paragraph [0013] line 3) that "high purity" alumina (purity is not defined) dielectric strength can be 475 V/mm or 1852 V/mil, but that this material is difficult to process and is not adequate for conventional spark-plug insulator manufacturing. None of the other properties listed as important are disclosed for any of the claimed materials by the inventor. The inventor specifically references U.S. Pat. No. 4,879,260 (Manning) and U.S. Pat. No. 7,169,723 (Walker Jr.) in which the additions of Zr, Ca, Si, Mg, Ca, B oxides and BN are added to alumina ceramics in order to improve the dielectric strength of alumina. The inventors of U.S. Pat. No. 8,053,966 and U.S. Publication No. 2010/0175655 A1 also do not recognize that the listed combination of additives (MgO, CaO, $ZrO_2$ and $B_2O_3$ and BN) (sintering aids) described in U.S. Publication No. 2010/0175655 A1 are not effective in obtaining dense sintered silicon nitride or obtaining desired properties for silicon nitride, although they may be so for alumina materials.

Sintering aids, their levels and methods of processing required for effective sintering of silicon nitride and the combination of the sintering aids that result in desirable material properties for corona discharge ignition systems are not given in the above mentioned prior art, and the ones discussed therein would not result in adequate materials.

U.S. Pat. No. 5,358,912 (Freitag et al) discloses Barium Aluminum Silicate in situ reinforced silicon nitride that is pressureless sintered and contains about 3% porosity (Table 1) after sintering, which is too high to achieve high dielectric strengths for CDI insulators. Although some of the compositions show low dielectric constants at 35 GHz, values at 1 MHz (important for the CDI application) are not disclosed. It is known that dielectric properties are especially frequency dependent. Dielectric loss tangents are not disclosed. Therefore, improvements are required for materials of this invention to be considered for a CDI application.

U.S. Publication No. 2006/0014624 A1 (Mikijelj) discloses silicon nitride compositions which result in very high dielectric strengths and low electrical conductivity, but do not identify other properties that need to be satisfied in order for the said silicon nitride to be used in a corona discharge ignition system or how effective it may be in that application.

From the description of the prior art above it can be seen that materials of the prior art (alumina, silica, boron nitride and aluminum nitride) for the use in CDI systems are not adequate and have deficiencies in some of their properties. Dielectric strength is low (alumina), dielectric constant and loss tangent is high (alumina and aluminum nitride e' is 9 or above), the material is too soft (boron nitride), the material mechanical strength and fracture toughness are low. Although silicon nitride is mentioned in the prior art in general terms, none of the prior art recognizes the sintering aids or their combination and amounts and ratios necessary to obtain the combination of properties required for the CDI system to work efficiently. The sintering aid system suggested in the prior art, in fact, does not work for silicon nitride. What is therefore still needed is an invention that provides the composition ranges and defines the ceramic material required for the properties to be met as well as how these materials can be made.

SUMMARY

The present invention comprises the $Si_3N_4$ ceramic insulator compositions with exceptionally high dielectric and mechanical strengths for use in corona discharge ignition (CDI) systems made from silicon nitride. Specifically, the invention comprises silicon nitride material compositions which, when the material is appropriately densified or sintered, provide high dielectric strength, high mechanical strength and fracture toughness, high electrical resistivity, high hardness, low dielectric constant and loss tangent, low thermal expansion coefficient and very low porosity levels, all of which have been identified as being important for the CDI system to work more efficiently than alumina ceramics described in prior art. Moreover, the materials of this invention retain their dielectric and structural integrity even at elevated temperature, such as above 800° C.

The invention also comprises a method of manufacture embodied in several distinct embodiments. In one embodiment, a sintered silicon nitride (SSN) process starting from $Si_3N_4$ powder batching, pressing, binder removal and sintering is used. A second preferred embodiment of the method of manufacture is a sintered reaction bonded silicon nitrided (SRBSN) process comprising the steps of: Si powder batching; powder pressing; binder removal; nitriding and sintering. Third and fourth embodiments are SSN and SRBSN processes respectively, in which gas pressure sintering is used for final densification. Gas pressure sintered SRBSN is the most preferred embodiment. Additional embodiments include SRBSN processing in which nitriding is performed using a continuous process according to U.S. Pat. No. 7,763,205.

It is therefore a principal object of the present invention to provide a monolithic silicon nitride compositions that exhibits high dielectric strength, high mechanical strength, high fracture toughness, low dielectric strength and loss tangent at 1 MHz, low porosity at room temperature and at elevated temperatures to approximately 800° C., that can be used as an insulator in a corona discharge igniter system. The combination of properties of the inventive $Si_3N_4$, allows substantially higher fuel efficiency increase (from 10% to 20%) when used instead of state of the art alumina insulators in CDI systems. The silicon nitride compositions of this invention are significantly different and have significantly better properties as compared to what the prior art recommends for use in DCI systems. This improvement in properties is directly responsible for the higher fuel efficiency in a CDI system.

It is still another object of the present invention to provide several embodiments of processes for the manufacture of monolithic silicon nitride materials above, for use in CDI systems.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

The FIGURE is a microstructure photograph of a composition according to an embodiment of the invention herein.

DETAILED DESCRIPTION

A range of $Si_3N_4$ compositions in this invention have been shown to exhibit an unexpected combination of desirable properties that are substantially higher than commercial alumina or aluminum nitride or silicon nitride materials of the prior art used in CDI systems. Sintering aids required to densify the silicon nitride of this invention include typically a combination rare earths (Y, Ce, La, Er, Gd and others), Al, Mg, Si (usually in form of single or oxides or other compounds) and may optionally include small amounts of transition metals added as carbides, nitrides or oxides either added intentionally or coming as impurities form the starting powders. The proportions in which the additives are mixed and how the material is processed affect its phase composition and the final material properties and therefore its usefulness in the CDI application.

In addition, it is shown that additives described in U.S. patent application Ser. No. 12/686,251 in the ranges described ($SiO_2$, $ZrO_2$, BN, $B_2O_3$, CaO, MgO) do not allow the densification of $Si_3N_4$ materials when used following procedures known in the science and art of sintering silicon nitride materials. It is shown that entirely different sintering aid systems are required to achieve the required properties for a CDI insulator.

Embodiment 1

In one embodiment of the invention a dense ceramic, preferably a silicon nitride material with porosity level less than about 0.6% is provided, with the said silicon nitride having following properties:

| | |
|---|---|
| Dielectric strength (kV/mm) | >6.6 |
| Dielectric Constant | <8.3 |
| Loss Tangent | <0.006 |
| Modulus of Rupture (MPa) | >500 |
| Fracture Toughness (MPa · $m^{1/2}$) | >5 |
| TEC ($10^{-6}$ 1/° C.) RT-1000° C. | <3.5 |
| Phase composition | $\beta$-$Si_3N_4$ + silicon-oxynitride glass with optional minor grain boundary crystalline phase |

In this embodiment, silicon nitride is comprised of mostly $\beta$-$Si_3N_4$ or $\beta$-Sialon acicular (elongated) grains and has grain boundaries that are glassy or are partially crystalline. The glassy grain-boundary is a silicon-oxy-nitride based glass containing rare earths (Y, Ce, La, Er, Lu or others), Al, Mg, Ca dissolved in the glass and optionally contains small amounts of transition metal silicides (Fe, Mo, Ti, Cr or other) in the form of small inclusions. The crystalline phases can be any of the phases containing the rare earths, Si, N and O, for example K, J or melellite like phase or a rare-earth silicate phase. The overall chemical composition of the sintered $Si_3N_4$ of this embodiment is as follows:

| Element | (wt %) |
|---|---|
| Si | 48-56 |
| N | 32-38 |
| Al | 0.5-9 |
| Rare earth elements, at least one (total) Y, La, Er, Ce, Gd, Lu or other | 0.5-9 |
| Mg | 0-0.3 |
| Fe, Mo or other transition metal, total | 0.01-1 |
| O | 1-9 |
| C | 0.3-1.5 |

Embodiment 2

In the second embodiment of the invention a dense ceramic, preferably a silicon nitride material with porosity level less than about 0.6% is provided, with the said silicon nitride having following properties:

| | |
|---|---|
| Dielectric strength (kV/mm) | >15 |
| Dielectric Constant | ≤8.2 |
| Loss Tangent | <0.003 |
| Modulus of Rupture (MPa) | >600 |
| Fracture Toughness (MPa · $m^{1/2}$) | >5 |
| TEC ($10^{-6}$ 1/° C.) RT-1000° C. | ≤3.3 |
| Phase composition | β-$Si_3N_4$ + silicon-oxynitride glass with optional minor grain boundary crystalline phase |

In this embodiment, silicon nitride is comprised of mostly β-$Si_3N_4$ or β-Sialon acicular (elongated) grains and has grain boundaries that are glassy or are partially crystalline. The glassy grain-boundary is a silicon-oxy-nitride based glass containing rare earths (Y, Ce, La, Er, Lu or others), Al, Mg, Ca dissolved in the glass and optionally contains small amounts of transition metal silicides (Fe, Mo, Ti, Cr or other) in the form of small inclusions. The crystalline phases can be any of the phases containing the rare earths, Si, N and O, for example K, J or melellite like phase or a rare-earth silicate phase. The overall chemical composition of the sintered $Si_3N_4$ of this embodiment is as follows:

| Element | (wt %) |
|---|---|
| Si | 49-54 |
| N | 32-38 |
| Al | 2-9 |
| Rare earth elements, at least one (total) Y, La, Er, Ce, Gd, Lu or other | 1-4 |
| Mg | 0-0.3 |
| Fe, Mo or other transition metal, total | 0.01-1 |
| O | 3-8 |
| C | 0.3-1.5 |

Embodiment 3

In the third, preferred embodiment of the invention a dense ceramic, preferably a silicon nitride material with porosity level less than about 0.5% is provided, with the said silicon nitride having following properties:

| | |
|---|---|
| Dielectric strength (kV/mm) | >20 |
| Dielectric Constant | ≤8.2 |
| Loss Tangent | <0.002 |
| Modulus of Rupture (MPa) | >700 |
| Fracture Toughness (MPa · $m^{1/2}$) | >5 |
| TEC ($10^{-6}$ 1/° C.) RT-1000° C. | ≤3.3 |
| Phase composition | β-$Si_3N_4$ + silicon-oxynitride glass with optional minor grain boundary crystalline phase |

In this embodiment, silicon nitride is comprised of mostly β-$Si_3N_4$ or β-Sialon acicular (elongated) grains and has grain boundaries that are glassy or are partially crystalline. The glassy grain-boundary is a silicon-oxy-nitride based glass containing rare earths (Y, Ce, La, Er, Lu, Gd or others), Al, Mg, Ca dissolved in the glass and optionally contains small amounts of transition metal silicides (Fe, Mo, Ti, Cr or other) in the form of small inclusions. The crystalline phases can be any of the phases containing the rare earths, Si, N and O, for example K, J or melellite like phase or a rare-earth silicate phase. The overall chemical composition of the sintered $Si_3N_4$ of this embodiment is as follows:

| | |
|---|---|
| Si | 49-54 |
| N | 35-38 |
| Al | 2-7 |
| Rare earth elements, at least one (total) Y, La, Er, Ce, Gd, Lu or other | 1-3 |
| Mg | 0-0.3 |
| Fe, Mo or other transition metal, total | 0.01-1 |
| O | 3-6 |
| C | 0.3-1.5 |

Embodiment 4

In the fourth preferred embodiment of the invention a dense ceramic, preferably a silicon nitride material with porosity level less than about 1.5% is provided (preferably less than 1%) with the said silicon nitride having following properties:

| | |
|---|---|
| Dielectric strength (kV/mm) | >20 |
| Dielectric Constant | ≤7.7 |
| Loss Tangent | <0.002 |
| Modulus of Rupture (MPa) | >500 |
| Fracture Toughness (MPa · $m^{1/2}$) | >5 |
| TEC ($10^{-6}$ 1/° C.) RT-1000° C. | ≤4.2 |
| Phase composition | β-$Si_3N_4$ + hexacelsian |

In this embodiment, silicon nitride is comprised of mostly β-$Si_3N_4$ or β-Sialon acicular (elongated) grains and has grain boundaries that are predominantly crystalline, containing barium-aluminum silicate hexa-celsian phase. The grain boundary phase can also contain some Sr metal, which may be a part of the crystalline phase. The overall chemical composition of the sintered $Si_3N_4$ of this embodiment is as follows:

| | |
|---|---|
| Si | 34-49 |
| N | 19-31 |
| Al | 2.5-5.8 |
| Ba | 8-20 |

-continued

| | |
|---|---|
| Sr | 0-8 |
| La or other rare earth | 0-0.5 |
| Fe, Mo or other transition metal, total | 0.01-1 |
| O | 8-20 |
| C | 0.3-1.5 |

CDI system insulators from silicon nitride described in embodiments 1, 2 and 3 can be manufactured using several different process embodiments.

Process Embodiment 1

One embodiment for producing CDI system insulators is a sintered silicon nitride process in which fine $Si_3N_4$ powder with sufficiently high specific surface area (typically 5-12 $m^2/g$) and adequate purity is mixed with sintering aids in the form of oxides or other compounds that will result in oxides after thermal processing. Sintering aids include typically a combination that includes oxides of Al, Mg, Ba, Sr, Si, Y, Er, La, Ce (and other rare earths). These can be added as oxides or other compounds which decompose or form oxides upon heating.

It is known in the art that the mixing can be accomplished in a suitable solvent (water or organic) to which dispersants and binders can be added. The slurry can be spray-dried, or dried in other ways to yield a powder that can be dry pressed or isopressed in a die with a suitable shape for the part desired. The part can then be green machined.

Parts can also be shaped from the mixed powder using extrusion, gel or other casting method or injection molding, the latter allowing more net shape capability for the part. After the part is shaped, it is exposed to thermal processing called binder burnout in which the organic binder is removed from the part. In the case of extrusion or injection molding, binder removal also may require dissolution of the portion of the binder in a solvent, followed by a thermal process.

After the green part without the binder is obtained, it is sintered in a furnace with a nitrogen-containing atmosphere that is oxygen free.

Sintering can be done at ambient pressure (pressureless sintering), at peak temperatures of around 1700-2000° C. depending on the material composition and type of furnace used.

Preferably gas pressure sintering can be used to densify the parts, as this process substantially reduces the amount of porosity in the material.

Hot isostatic pressing can also be used, and this can be the most preferable process (the least amount of porosity) however it is also the most expensive process route.

Process Embodiment 2

Preferred process embodiment for CDI insulators is the sintered reaction bonded silicon nitride (SRBSN) process because it can provide lower cost insulators. In this embodiment, instead of using silicon nitride powder, fine Si powder is used which is considerable less expensive than $Si_3N_4$.

As in the previous embodiment, the Si powder is mixed with the same sintering aids (quantities are adjusted based on the desired material composition after Si nitriding), in the same manner. Parts can be formed and the binder removed from them in the same ways as described in process embodiment 1.

After the binder is removed, the parts are heated in a nitrogen containing atmosphere (oxygen free) in the temperature range between 1100 to about 1400° C. for a sufficient time to convert all the Si metal to $Si_3N_4$. Nitriding can be accomplished in a batch process or it can be done in a continuous nitriding furnace as described in U.S. Pat. No. 7,763,205 or similar. Continuous nitriding is a preferred process because it is less expensive, faster and more consistent.

After completion of nitriding, sintering or densification can be accomplished using the same options as given before. Sintering is done in a furnace with a nitrogen-containing atmosphere that is oxygen free.

Sintering can be done at ambient pressure (pressureless sintering), at peak temperatures of around 1700-2000° C. depending on the material composition and type of furnace used.

Preferably, gas pressure sintering can be used to densify the parts, as this process substantially reduces the amount of porosity in the material.

Hot isostatic pressing can also be used, and this can be the most preferable process (the least amount of porosity) however it is also the most expensive process route.

Examples

Table 1 provides the starting powder compositions that were used as examples for the materials of this invention, with the remainder being $Si_3N_4$. Examples A to J are examples of this invention, and comp 1-4 are comparative examples of the prior art described in U.S. patent application Ser. No. 12/686,251.

The powder mixtures according to Table 1 were made using the SRBSN process, starting from Si metal powder with a surface area of 1.5 to 3 $m^2/g$ and purity higher that 99%, with major impurities being Fe (required for nitriding), Al and Ca, in addition to small amounts of O on the surface. The sintering aids were added as oxides (with the exception of BN that was added as a nitride and $Mo_2C$ as a carbide), and the amounts were adjusted based on complete conversion of Si to $Si_3N_4$. Compositions A, G and N were also made starting from $Si_3N_4$ powder instead of Si (powder surface area was 10.6 $m^2/g$, purity 99%). The sintering aid powders used have surface areas of 2 $m^2/g$ or higher. If the surface area is lower, ball milling was used to increase it.

TABLE 1

Examples of comparative and inventive $Si_3N_4$ compositions
$Si_3N_4$ examples and compositions

| Example | % $Al_2O_3$ | % $Y_2O_3$ | % $CeO_2$ | % $Er_2O_3$ | % $La_2O_3$ | % $SiO_2$ | % MgO | % $Mo_2C$ | $B_2O_3$ | other |
|---|---|---|---|---|---|---|---|---|---|---|
| A | 10 | 2 | — | — | — | — | — | — | — | — |
| B | 16 | 2 | — | — | — | — | — | — | — | — |
| C | 2 | — | 10 | — | — | — | — | — | — | — |
| D | — | — | — | 8 | — | 2.5 | 0.5 | — | — | — |

TABLE 1-continued

Examples of comparative and inventive $Si_3N_4$ compositions
$Si_3N_4$ examples and compositions

| Example | % $Al_2O_3$ | % $Y_2O_3$ | % $CeO_2$ | % $Er_2O_3$ | % $La_2O_3$ | % $SiO_2$ | % MgO | % $Mo_2C$ | $B_2O_3$ | other |
|---|---|---|---|---|---|---|---|---|---|---|
| E | 5 | — | — | — | 5 | — | — | 0.2 | — | — |
| F | 2 | — | — | — | 5 | — | — | — | — | — |
| G | 5 | 2 | — | — | — | 0.25 | — | — | — | — |
| N | 5 | 2 | — | — | — | — | — | 0.07 | — | — |
| I | 2 | 8 | — | — | — | — | — | — | — | — |
| J | 2 | 5 | — | — | — | — | — | 0.07 | — | — |
| S | — | — | — | — | — | — | — | — | — | 8% $LaAlO_3$ |
| T | 6.5 | — | — | — | — | 10.5 | — | — | — | 13.2% BaO |
| U | 5.3 | — | — | — | 0.5 | 10.7 | — | — | — | 10.7% BaO |
| V | 10.7 | — | 0.3 | — | — | 17.2 | — | — | — | 21.8% BaO |
| comp 1 | 5 | — | — | — | — | — | — | — | 1 | — |
| comp 2 | — | — | — | — | — | 0.5 | — | — | — | 2% CaO |
| Comp 3 | 2 | — | — | — | — | — | — | — | — | 5% BN |
| comp 4 | — | — | — | — | — | 5 | — | — | — | 0.5 $ZrO_2$ |

Powders were batched by mixing them in water or an organic solvent to which a dispersant was added as well as a binder solution or suspension. The slurry was ball milled with alumina or $Si_3N_4$ (milling media) and subsequently screened though a 325 mesh screen, and was then spray dried in a commercial spray drier, giving a free flowing powder with a median agglomerate size of ~120-160 μm.

Using the above powders, 4×4×0.5" parts were pressed in a steel die to a green density of 68-72% of theoretical. The parts were labeled, and were then burned out at approximately 450° C. in a binder burnout furnace to remove all of the binder.

The parts that were made from Si powder were then nitrided in a standard nitriding batch furnace as well as a continuous furnace. Nitriding was done at peak temperature of 1400-1450° C. at the end of the process. The batch furnace used a nitrogen demand cycle. All parts nitrided completely with the exception of comp1 which had to be re-nitrided to complete the reaction.

All parts (including the SSN parts) were then sintered in a gas-pressure sintering furnace in a coated graphite crucible with packing powder, using a low pressure/high pressure cycle at the end of the run in order to completely densify the compositions and eliminate remaining porosity. The sintering temperature used was between 1700 and 1950° C. Sintering was done in nitrogen, and the final nitrogen pressure was 15,000 psi.

After the run was completed and the furnace cooled down, the parts were removed and cleaned by sand blasting. Density of all of the parts was measured using the Archimedes method. All of the parts of this invention were found to have at least 99% of theoretical density (based on its composition). Density was good for all SSN and SRBSN samples of this invention. Comparative compositions 1-4, which used the sintering aids of the prior art in U.S. patent application Ser. No. 12/686,251, did not completely densify and absorbed water.

The sintered plates of this invention were made into samples for the following tests:
Dielectric strength (ASTM D149 method on 0.010" thick sample)
Dielectric constant and loss tangent at 1 MHz
Material Strength (ASTM C1161, size B bars, 4 point method)
Fracture toughness (ASTM C1421)
Thermal expansion coefficient (TEC) from RT to 1000° C.
X-Ray Diffractometry and phase determination of materials
Microstructure and porosity determination after metallographic polishing (optical and SEM)

Table 2 lists three comparative alumina and one sintered AlN (aluminum nitride) materials that are commercially available and their properties. Alumina grades in Table 2 are used as spark plug insulators and are considered as state of the art.

TABLE 2

Comparative commercially available alumina and aluminum nitride materials used in spark plugs as insulators and their properties.

| Comparative Example | Dielectric Strength (KV/mm) | Dielectric constant (1 MHz) | Loss tangent (1 MHz) | MOR strength | Fracture Toughness (MPa·m$^{1/2}$) | Porosity level (%) | TEC*, RT-1000° C. (10$^{-6}$ 1/° C.) | Phase composition |
|---|---|---|---|---|---|---|---|---|
| $Al_2O_3$ C7000 | 6.6 | 10.1 | 0.010 | 380 | 3.1 | 0.9 | 8.0 | α-$Al_2O_3$ |
| $Al_2O_3$ 6270 | 4.1 | 9.5 | 0.006 | 350 | 3.0 | 1.3 | 8.1 | α-$Al_2O_3$ |
| $Al_2O_3$ UN | 5.8 | 9.9 | 0.008 | 330 | 3.8 | 1.8 | 8.1 | α-$Al_2O_3$ |
| AlN (sintered) | 6.5 | 9 | 0.006 | 320 | 3.0 | 0.8 | 4.5 | AlN |

*Thermal expansion coefficient

Table 3 has the results of property measurements made from materials of this invention. Results show that all of the inventive $Si_3N_4$ compositions have dielectric strength well above the state of the art aluminas in Table 2, and Examples A, G and N have dielectric strength above 10 kV/mm, well above of what is reported in the prior art. The inventive compositions demonstrate that they have other desirable properties for the CDI insulators that are considerably better that expected by the prior art:

Mechanical strength is typically above 600 MPa,
dielectric constant is below 8.4,
dielectric loss tangent is below 0.003,
the fracture toughness is above 5 MPa·m$^{1/2}$,
TEC is about $3.10^{-6}$ 1/° C. (much lower than alumina or aluminum nitride, giving the material superior thermal shock properties)
Porosity level below 0.06% all of which are desirable for the corona discharge igniter (CDI) insulator applications.

In addition, sintered samples were chemically analyzed to determine their overall composition (Table 4) in addition to the phase composition by XRD. Samples were analyzed for major constituent elements and for minor elements that are expected based on the purity of the incoming powders or elements that come from the process contamination. It should be noted that because different methods were used for the analysis, the totals may not add up to 100%.

TABLE 3

Properties of comparative and inventive $Si_3N_4$ compositions
Measured properties of examples

| Example | Dielectric Strength (KV/mm) | Dielectric constant (1 MHz) | Loss tangent (1 MHz) | MOR strength (MPa) | Fracture Toughness (MPa·m$^{1/2}$) | Porosity level (%) | TEC*, RT-1000° C. ($10^{-6}$ 1/° C.) | Phase composition |
|---|---|---|---|---|---|---|---|---|
| A | 26.2 | 7.9 | 0.001 | 650 | 5.1 | .02 | 3.3 | β-$Si_3N_4$ + RE-Al-oxynitride glass |
| B | 17.9 | 7.9 | 0.001 | 600 | 5.0 | .03 | 3.4 | β-$Si_3N_4$ |
| C | 9.2 | 8.1 | 0.001 | 640 | 6.0 | .03 | 3.2 | β-$Si_3N_4$ + RE-O—N—Si phase |
| D | 10.72 | 8.1 | 0.003 | 650 | 6.0 | .03 | 3.2 | β-$Si_3N_4$ + RE-Mg-oxynitride glass |
| E | 15.4 | 8.1 | 0.001 | 700 | 5.8 | .04 | 3.3 | β-$Si_3N_4$ + RE-Al-oxynitride glass |
| F | 16.3 | 8.1 | 0.003 | 740 | 6.8 | .03 | 3.2 | β-$Si_3N_4$ + RE-Al-oxynitride glass |
| G | 22.4 | 8.1 | 0.002 | 780 | 6.3 | .03 | 3.2 | β-$Si_3N_4$ + RE-Al-oxynitride glass |
| N | 20.7 | 7.9 | 0.0008 | 800 | 6.2 | .02 | 3.1 | β-$Si_3N_4$ + RE-Al-oxynitride glass |
| I | 6.8 | 8.1 | 0.002 | 700 | 6.0 | .05 | 3.3 | β-$Si_3N_4$ + K or J |
| J | 10.5 | 8.0 | 0.001 | 750 | 6.1 | .04 | 3.3 | β-$Si_3N_4$ + K or J |
| S | 11.0 | 8.2 | 0.002 | 700 | 6.5 | .05 | 3.3 | β-$Si_3N_4$ + RE-Al-oxynitride glass |
| T | 13.0 | 7.5 | 0.002 | 520 | 5.5 | 1.0 | 3.4 | β-$Si_3N_4$ + hexacelsian |
| U | 10 | 7.8 | 0.002 | 530 | 5.3 | 1.1 | 3.8 | β-$Si_3N_4$ + hexacelsian |
| V | 9.9 | 7.1 | 0.003 | 450 | 4.0 | 1.2 | 4.2 | β-$Si_3N_4$ + hexacelsian |
| comp 1 | Did not densify, absorbed water | | | | | >10 | | |
| comp 2 | Did not densify completely | | | | | >5 | | |
| comp 3 | Did not densify, absorbed water | | | | | >12 | | |

TABLE 4

Chemical analysis of sintered compositions

| Example | Al | Y | Ce | Er | La | Mg | Mo | B | Ca | Fe | Si | N | C | O |
|---|---|---|---|---|---|---|---|---|---|---|---|---|---|---|
| A | 5.29 | 1.57 | — | — | — | — | 0.03 | 0.01 | 0.1 | 0.2 | 52.8 | 35.1 | 0.3 | 5.1 |
| B | 8.47 | 1.57 | — | — | — | — | 0.02 | 0.01 | 0.2 | 0.3 | 49.2 | 32.7 | 0.2 | 7.9 |
| C | 1.06 | — | 8.14 | — | — | — | 0.01 | — | 0.2 | 0.3 | 52.8 | 35.1 | 0.8 | 2.8 |
| D | 0.02 | — | — | 7.00 | — | 0.30 | 0.01 | — | 0.1 | 0.4 | 54.1 | 34.8 | 0.5 | 3.0 |
| E | 2.65 | — | — | — | 4.26 | — | 0.20 | — | 0.1 | 0.4 | 53.9 | 35.8 | 0.6 | 3.1 |
| F | 1.06 | — | — | — | 4.26 | — | 0.01 | 0.01 | 0.2 | 0.3 | 55.8 | 37.1 | 0.5 | 1.6 |
| G | 2.65 | 1.57 | — | — | — | 0.15 | 0.01 | — | 0.1 | 0.3 | 55.7 | 37.0 | 0.7 | 2.8 |
| N | 2.65 | 1.57 | — | — | — | — | 0.07 | — | 0.2 | 0.3 | 55.8 | 37.0 | 0.2 | 2.7 |
| I | 1.06 | 6.30 | — | — | — | — | — | — | 0.1 | 0.2 | 54.0 | 35.9 | 0.4 | 2.6 |
| J | 1.06 | 3.94 | — | — | — | — | 0.07 | — | 0.2 | 0.4 | 55.8 | 37.0 | 0.3 | 2.0 |
| S | 1.79 | 4.60 | — | — | — | 0.01 | — | 0.01 | 0.02 | 0.3 | 55.0 | 34.9 | 0.1 | 3.3 |
| T | 3.4 | — | — | — | — | — | — | — | 11.8 Ba | 0.2 | 44.8 | 27.8 | 0.1 | 12.08 |
| U | 2.8 | — | — | — | 0.4 | — | — | — | — | 0.1 | 47.1 | 29.4 | 0.1 | 10.0 |
| V | 5.7 | — | 0.24 | — | — | — | — | — | — | 0.1 | 34.7 | 19.8 | 0.1 | 19.7 |

Inventive examples A to S in Table 3 also show that these materials consist of mostly crystalline β-$Si_3N_4$ based on XRD, and that some also contain minor amounts of crystalline phases residing in the grain boundary phase, surrounding the grains. Polished microstructure of the materials (by optical and scanning electron microscopy) show that the β-$Si_3N_4$ grains are elongated, and are surrounded by a grain boundary phase that is in many cases glassy (non-crystalline). The grain boundary phase, when analyzed by energy dispersive spectroscopy, has been found to always contain Si, O, and N, and in addition the sintering aids used for making the material: Al, Y, La, Ce, Gd, Er, other rare earth oxides, Mg and so on. This phase is a silicon-oxy-nitride glass.

The FIGURE shows the scanning electron microscope microstructure of composition N silicon nitride. $Si_3N_4$ grains are gray and elongated and the phase surrounding the grains (lighter in color) is silicon-oxy-nitride containing dissolved Al and Y.

The $Si_3N_4$ material of inventive composition N was used to manufacture several insulators for testing in a CDI system. State of the art alumina insulator of the same shape was tested in the same application. Test results showed that $Si_3N_4$ composition N material performed better than state of the art alumina. The fuel economy when using the CDI system with the $Si_3N_4$ composition insulator showed about a 20% improvement, while the alumina provided about a 10% improvement. Based on the results in Table 3, it is reasonable to predict that compositions G or A or further optimized material properties of this invention would provide even better results in the CDI system.

Inventive examples T, U, V show that the additives to silicon nitride powder based on additions of Ba, Al and Si oxides with total additions of about 25-50% by weight, lead to silicon nitride with a dielectric constant lower that 7.8 which is important for the CDI system. This additive system also allows small additions of rare earths that can improve other properties, including lowering porosity level.

The comparative 1-4 examples also demonstrate that the prior art description of silicon nitride compositions (−251) for the corona discharge igniter (CDI) insulator application cannot be densified when followed and that they are different from this invention.

A person having skill in the science and art of making silicon nitride will know that in addition to the rare earths listed and tested in the inventive examples, all other rare earths are good sintering aids for silicon nitride when combined with aluminum, magnesium or silicon oxide-containing sintering aids. Therefore, use of other rare earths not specifically mentioned does not deviate from this invention. It is also clear that the properties of importance for the CDI insulator application have not been optimized in the listed examples and that further optimization is possible without deviation from the invention.

I claim:

1. A ceramic insulator material comprising a silicon nitride ceramic comprising β-$Si_3N_4$ or β-SiAlON grains and a barium-aluminum silicate phase surrounding the grains, wherein the ceramic insulator material comprises:
   49-56 wt % silicon;
   34-38 wt % nitrogen;
   2-7 wt % aluminum;
   1-5 wt % at least one rare earth element;
   0-0.3 wt % at least one of magnesium, calcium, and barium;
   0.01-1 wt % transition metal;
   3-6 wt % oxygen; and
   0.3-1.5 wt % carbon
and further wherein the ceramic insulator material has a dielectric strength of greater than 10 KV/mm, a modulus of rupture strength of at least 500 MPa, a dielectric constant of less than 8.3, a dielectric loss tangent less than 0.003 at 1 MHz, a fracture toughness of at least 5.5 MPa·$m^{1/2}$, a thermal expansion coefficient of less than $4\times10^{-6}$ 1/° C., and a porosity level less than 0.06%.

2. The ceramic insulator material of claim 1 in an internal combustion engine.

* * * * *